W. G. BLACK.
SHOCK ABSORBER.
APPLICATION FILED OCT. 3, 1921.
1,436,079. Patented Nov. 21, 1922.
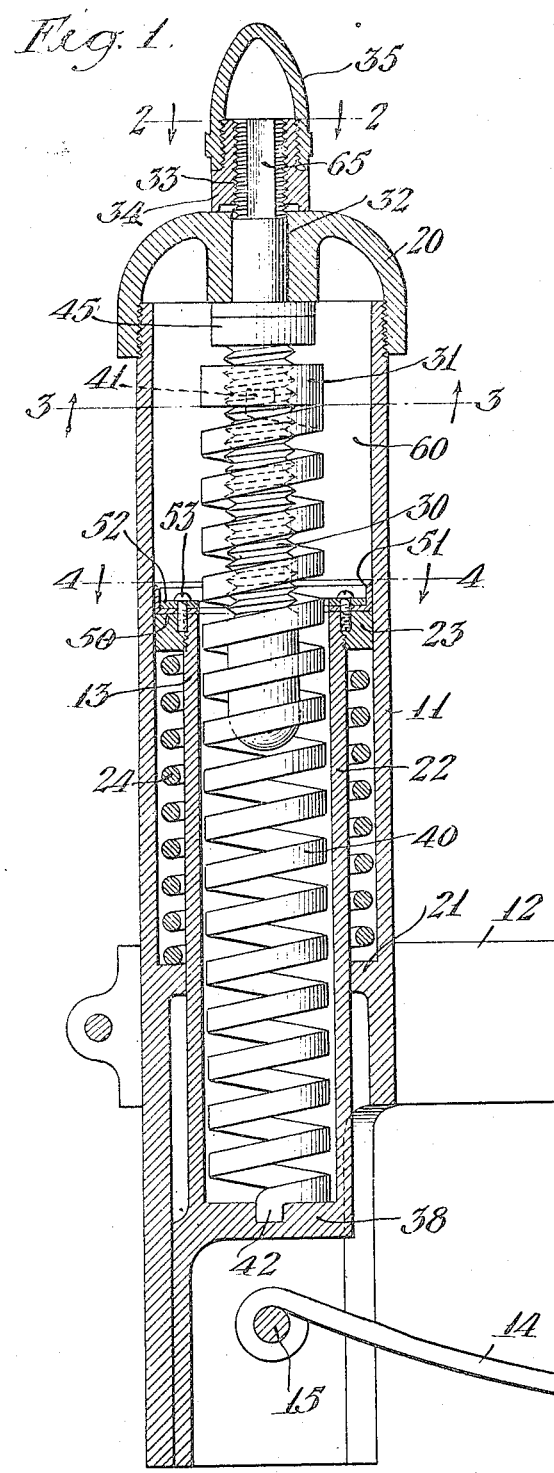
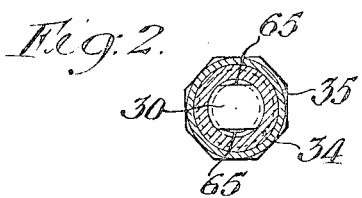
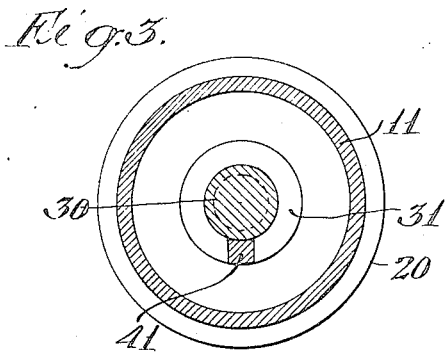
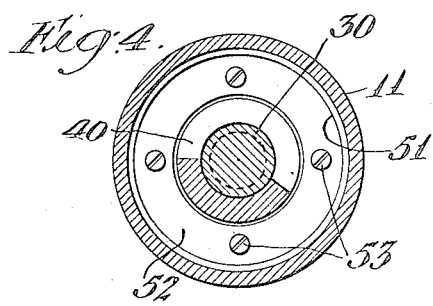
Inventor
Walter G. Black
by Graham + Hair
Attorneys Patented Nov. 21, 1922.

1,436,079

UNITED STATES PATENT OFFICE.

WALTER G. BLACK, OF WHITTIER, CALIFORNIA.

SHOCK ABSORBER.

Application filed October 3, 1921. Serial No. 504,959.

*To all whom it may concern:*

Be it known that I, WALTER G. BLACK, a citizen of the United States, residing at Whittier, county of Los Angeles, and State of California, have invented a new and useful Shock Absorber, of which the following is a specification.

This invention relates to devices which are adapted to use between interconnected objects to alleviate the transmission of shocks, due to the sudden application of force from one object to the other, and is particularly applicable to use on automobiles.

It is an object of my invention to provide a shock absorber in which will be combined the positiveness of action rendered by springs and the flexibility and smoothness of an air cushion.

It is a further object of my invention to provide in a device of this character means which will absorb those shocks due to recoil, as well as the initial shocks.

It is also a further object of my invention to provide in a shock absorber of this type a means of regulating the adjustment of the spring elements thereof, thus readily adapting my invention to different conditions of loading.

Other objects and advantages will be made evident hereinafter.

Referring to the drawing which is for illustrative purposes only,

Fig. 1 is a vertical sectional view of a shock absorber, embodying my invention.

Fig. 2 is a section taken on the plane represented by the line 2—2 of Fig. 1.

Fig. 3 is an incorporated section taken on a plane represented by the line 3—3, and looking in the direction of the appended arrows.

Fig. 4 is a section taken on a plane represented by the line 4—4 of Fig. 1.

As shown in the drawings, I employ a barrel 11, adapted to be suitably mounted by a frame extension 12 of an automobile chassis in which barrel there operates a piston 13 to which the relief spring 14 may be attached, as shown at 15, thus providing a sensitive resilient connection between the spring 14 and the chassis 12, in order that sudden shocks applied through the wheels to the spring may be minimized in their transmission to the chassis.

The barrel 11 is provided with a tightly fitting cap 20, and near the lower end thereof is formed interiorly a ring 21 through which operates a cup 22 having screwed upon the upper end thereof a ring 23 of the same diameter as the interior of the barrel. This manner of constructing the piston 13 makes it possible to surround the cup 22 with a spring 24 which will act in compression between the ring 21, formed upon the interior of the barrel 11, and the ring 23, mounted by the cup 22, thus resisting the relatively downward movement of the piston 11, as occurs in the recoil of the spring 14 after its being compressed by the application of force due to striking an obstruction.

Centrally extending within the barrel 11 is a shaft 30 upon which is threaded a nut 31. The shaft 30 extends through a hole 32 provided therefor in the head 20, and upon the external threaded portion 33 thereof is placed a locking nut 34 mounting a suitable cap 35. Extending between the nut 31 and the bottom 38 of the cup 22 is a compression spring 40, having outwardly bent ends 41 and 42 which fit into recesses in the bottom 38 and the nut 31 to prevent any relative rotation of the members between which the spring exerts its pressure. A collar 45 transfers the force exerted by the spring 40 to the head 20. Thus it will be seen that the spring 40 serves in compression as a flexible support between the chassis extension 12 and the spring 14. Upon the upper face 50 of the piston 13 I mount a cup washer 51, securing same in place by the use of a ring 52 and screws 53 which further serve to prevent the ring 23 from becoming unscrewed from the cup 22.

When a force is abruptly applied upwardly to the cup 22 from the spring 14, the flexibility of the spring 40 allows the piston 13 to move relatively upward toward the barrel head 20. The air contained in the chamber 60, formed between the head 20 and the piston, is compressed and exerts a resisting force with the spring 40 in overcoming the force of the shock. After the force of the shock has been dissipated, it is the tendency of the spring and the body of compressed air to return to their conditions under normal load, and the piston 13 is moved downward with considerable force, whereupon the spring 24 comes into compressive action and absorbs the shock that would otherwise be produced by the unstrained recoil of the spring 40 and the body of air compressed in the chamber 60, The initial compression of the spring 40 may be adjusted to suit the conditions of loading, without the necessity of dismantling the shock absorber further than unscrewing the nut 34 from the externally projecting portion 33 of the shaft 30. By the use of a wrench upon the flat sides 65 of the projection 33 the shaft 30 may be revolved to cause the movement of the nut 31 therealong. After the initial compression of the spring 40 is properly adjusted, the nut 34 is again screwed upon the projection 33 and the shaft 30 locked against turning.

A particular feature of my invention resides in the novel combination of a compressible spring and a body of air which may be subjected to compression therewith, thus providing a positiveness of action as well as considerable flexibility.

I claim as my invention:

1. In a shock absorber, the combination of: a barrel; means for attaching said barrel to the chassis of an automobile; a head closing one end of said barrel; a piston operative within said barrel having integral therewith a cup extending in a direction opposite to said head; means for attaching said piston to a spring of an automobile; a circular ring formed upon the inside of said barrel and surrounding said cup; a spring acting between said piston and said ring to resist the movement of said piston away from said head; a spring acting between said head and the bottom of said cup to resist the movement of said piston toward said head; means for varying the initial compression in said last named spring; and means associated with said piston to prevent the escape of enclosed air from between said piston and said head, thus providing an air cushion.

2. In a shock absorber, the combination of: a barrel; means for attaching said barrel to the chassis of an automobile; a head closing one end of said barrel; a piston operative within said barrel having integral therewith a cup extending in a direction opposite to said head; means for attaching said piston to a spring of an automobile; a circular ring formed upon the inside of said barrel and surrounding said cup; a spring acting between said piston and said ring to resist the movement of said piston away from said head; a shaft turnably extending through said head and having threads formed upon that portion extending within said barrel; a nut upon said threaded portion of said shaft; a spring acting between said nut and the bottom of said cup to resist the movement of said piston toward said head; means for turning said shaft to cause the movement of said nut therealong; and means associated with said piston to prevent the escape of enclosed air from between said piston and said head, thus providing an air cushion.

3. In a shock absorber, the combination of: a barrel; means for attaching said barrel to the chassis of an automobile; a head closing one end of said barrel; a piston operative within said barrel having integral therewith a cup extending in a direction opposite to said head; means for attaching said piston to a spring of an automobile; a circular ring formed upon the inside of said barrel and surrounding said cup; a spring acting between said piston and said ring to resist the movement of said piston away from said head; a shaft turnably extending through said head and having threads formed upon that portion extending within said barrel; a nut upon said threaded portion of said shaft; a spring acting between said nut and the bottom of said cup to resist the movement of said piston toward said head; means for turning said shaft to cause the movement of said nut therealong; means for locking said shaft in any position of adjustment; and means associated with said piston to prevent the escape of enclosed air from between said piston and said head, thus providing an air cushion.

In testimony whereof, I have hereunto set my hand at Los Angeles, California, this 23d day of Sept., 1921.

WALTER G. BLACK.